(12) United States Patent
Liao et al.

(10) Patent No.: US 12,327,194 B2
(45) Date of Patent: Jun. 10, 2025

(54) ACTIVE LEARNING USING CAUSAL NETWORK FEEDBACK

(71) Applicant: International Business Machines Corporation, Armonk, NY (US)

(72) Inventors: Qingzi Liao, White Plains, NY (US); Bhavya Ghai, Stony Brook, NY (US); Yunfeng Zhang, Chappaqua, NY (US); Tian Gao, Berkeley Heights, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1166 days.

(21) Appl. No.: 17/164,963

(22) Filed: Feb. 2, 2021

(65) Prior Publication Data

US 2022/0245508 A1    Aug. 4, 2022

(51) Int. Cl.
*G06N 3/091* (2023.01)
*G06N 5/04* (2023.01)
*G06N 20/00* (2019.01)

(52) U.S. Cl.
CPC .............. *G06N 3/091* (2023.01); *G06N 5/04* (2013.01); *G06N 20/00* (2019.01)

(58) Field of Classification Search
CPC ........... G06N 20/00; G06N 5/04; G06N 3/091
See application file for complete search history.

(56) References Cited

U.S. PATENT DOCUMENTS 8,655,821 B2    2/2014  Aliferis et al.
11,893,772 B1 *  2/2024  Gokalp ................ G06V 10/758
(Continued)

FOREIGN PATENT DOCUMENTS

CN    109934299 A    6/2019
CN    110737812 A    1/2020
(Continued)

OTHER PUBLICATIONS

Y. Fu, B. Li, X. Zhu and C. Zhang, "Active Learning without Knowing Individual Instance Labels: A Pairwise Label Homogeneity Query Approach," in IEEE Transactions on Knowledge and Data Engineering, vol. 26, No. 4, pp. 808-822, Apr. 2014, doi: 10.1109/TKDE.2013.165. (Year: 2014).*
(Continued)

*Primary Examiner* — Andrew L Tank
(74) *Attorney, Agent, or Firm* — Garg Law Firm, PLLC; Rakesh Garg; James Olsen

(57) ABSTRACT

An embodiment includes identifying, from a training dataset for training a model, a first unlabeled datapoint to present for labelling according to a first query strategy. The embodiment also includes issuing a query requesting a label for the first unlabeled datapoint. The embodiment also includes receiving a labeled datapoint in response to the query, the labeled datapoint comprising the first unlabeled datapoint as labeled by an oracle. The embodiment also includes generating a causal network based on labeled datapoints from the training dataset. The embodiment also includes receiving an instruction to modify the causal network. The embodiment also includes replacing the first query strategy with a second query strategy based on the instruction to modify the causal network. The embodiment also includes identifying, from the training dataset, a second unlabeled datapoint to present for labelling according to the second query strategy.

20 Claims, 9 Drawing Sheets

(56) References Cited

U.S. PATENT DOCUMENTS

| | | | |
|---|---|---|---|
| 11,915,113 B2* | 2/2024 | Beaver | G06N 20/20 |
| 11,922,305 B2* | 3/2024 | Ramachandran | G06F 40/35 |
| 11,966,839 B2* | 4/2024 | van den Oord | G06N 20/00 |
| 2008/0256035 A1 | 10/2008 | Zhang et al. | |
| 2010/0250473 A1* | 9/2010 | Porikli | G06N 20/10 |
| | | | 706/20 |
| 2017/0337200 A1 | 11/2017 | Teofili et al. | |
| 2018/0032901 A1* | 2/2018 | Chowdhury | G06F 40/169 |
| 2019/0180195 A1* | 6/2019 | Terry | G06F 40/295 |
| 2019/0354810 A1* | 11/2019 | Samel | G06F 18/2115 |
| 2020/0050968 A1* | 2/2020 | Lee | G06N 20/00 |
| 2020/0250527 A1* | 8/2020 | Zhao | G06N 3/047 |
| 2020/0380311 A1* | 12/2020 | Lourentzou | G06F 40/169 |
| 2021/0004700 A1* | 1/2021 | Prabhu | G06F 16/2468 |
| 2021/0133631 A1* | 5/2021 | Prendki | G06F 16/2379 |
| 2021/0209412 A1* | 7/2021 | Quader | G06F 18/214 |
| 2021/0351973 A1* | 11/2021 | Ford | H04L 43/067 |
| 2021/0357776 A1* | 11/2021 | Quader | G06N 20/20 |
| 2022/0027764 A1* | 1/2022 | Lafond | G06N 3/08 |
| 2022/0108075 A1* | 4/2022 | Kehler | G06F 40/20 |
| 2022/0230095 A1* | 7/2022 | Stergioudis | G06N 5/043 |

FOREIGN PATENT DOCUMENTS

| | | |
|---|---|---|
| IN | 202041001340 A | 1/2020 |
| WO | 2020068784 A1 | 4/2020 |

OTHER PUBLICATIONS

Castro, Rui, et al. "Human active learning." Advances in neural information processing systems 21 (2008). (Year: 2008).*

M. Nashaat, A. Ghosh, J. Miller, S. Quader, C. Marston and J.-F. Puget, "Hybridization of Active Learning and Data Programming for Labeling Large Industrial Datasets," 2018 IEEE International Conference on Big Data (Big Data), Seattle, WA, USA, 2018, pp. 46-55, doi: 10.1109/BigData.2018.8622459. (Year: 2018).*

L. Lin, K. Wang, D. Meng, W. Zuo and L. Zhang, "Active Self-Paced Learning for Cost-Effective and Progressive Face Identification," in IEEE Transactions on Pattern Analysis and Machine Intelligence, vol. 40, No. 1, pp. 7-19, Jan. 1, 2018, doi: 10.1109/TPAMI.2017.2652459. (Year: 2018).*

Sundin, Iiris, et al. "Active learning for decision-making from imbalanced observational data." International conference on machine learning. PMLR, 2019. (Year: 2019).*

Z. Wang, B. Du, L. Zhang, L. Zhang and X. Jia, "A Novel Semisupervised Active-Learning Algorithm for Hyperspectral Image Classification," in IEEE Transactions on Geoscience and Remote Sensing, vol. 55, No. 6, pp. 3071-3083, Jun. 2017, doi: 10.1109/TGRS.2017.2650938. (Year: 2017).*

Jones et al., Active learning for human action retrieval using query pool selection, Jan. 26, 2014.

Zhu et al., Active learning with sampling by uncertainty and density for data annotations, IEEE Transactions on audio, speech, and language processing 18.6 (2009): 1323-1331, Aug. 2010.

Nguyen et al., Active learning using pre-clustering, Proceedings of the twenty-first international conference on Machine learning. ACM, 2004.

Dasgupta et al., Hierarchical sampling for active learning, Proceedings of the 25th international conference on Machine learning, ACM, Jul. 2008.

Ebert et al., Ralf: A reinforced active learning formulation for object class recognition, 2012 IEEE Conference on Computer Vision and Pattern Recognition, 2012.

Donmez et al., Dual strategy active learning, European Conference on Machine Learning, Springer, Berlin, Heidelberg, 2007.

Huang et al., Active Learning by Querying Informative and Representative Examples, IEEE Transactions on Pattern Analysis and Machine Intelligence, vol. 36, No. 10, Oct. 2014.

Kalisch et al., Estimating High-Dimensional Directed Acyclic Graphs with the PC-Algorithm, Journal of Machine Learning Research 8 (2007) 613-636, Mar. 2007.

Settles, Active Learning Literature Survey, Jan. 9, 2009.

* cited by examiner

ACTIVE LEARNING USING CAUSAL NETWORK FEEDBACK

BACKGROUND

The present invention relates generally to a method, system, and computer program product for machine learning. More particularly, the present invention relates to a method, system, and computer program product for active learning using causal network feedback.

Artificial intelligence (AI) is an area of computer science that refers to any human-like intelligence exhibited by a computer, robot, or other machine. In recent years, AI technology has quickly become a part of everyday life for many people. AI technology enables applications that are used to complete words as they are being typed, provide driving directions, efficiently and autonomously vacuum floors, recommend products or entertainment options, and assist with medical image analysis. The surge in AI development has been made possible by the increasing availability of large amounts of data and the corresponding development and wide availability of computer systems that can process all that data faster and more accurately than humans.

Machine learning is a branch of AI focused on technology that learns from data and performs a task with increasing accuracy over time. In general, there are three common approaches to machine learning: supervised, unsupervised and semi-supervised. In supervised machine learning approaches, the computer is provided example inputs of manually-labeled training data, and their desired outputs, with the goal of generating general rules and features that can subsequently be used to associate a given input with a corresponding output. In contrast, unsupervised learning approaches do not use labeled training data to learn explicit features. Instead, these approaches infer functions to discover non-obvious or hidden structures within unlabeled data.

Alternatively, semi-supervised approaches to machine learning typically use labeled data in combination with unlabeled data for training. One such approach is known as active learning. In active learning, a semi-supervised machine learning algorithm interactively queries an oracle, typically a human annotator, to obtain labels for a subset of unannotated input data. In such active learning approaches, the learner typically chooses the examples to be labeled. As a result, the number of examples needed to learn a concept may be lower than the number of examples needed for typical supervised learning approaches.

SUMMARY

The illustrative embodiments provide for active learning using causal network feedback. An embodiment includes identifying, from a training dataset for training a model, a first unlabeled datapoint to present for labelling according to a first query strategy. The embodiment also includes issuing a query requesting a label for the first unlabeled datapoint. The embodiment also includes receiving a labeled datapoint in response to the query, the labeled datapoint comprising the first unlabeled datapoint as labeled by an oracle. The embodiment also includes generating a causal network based on labeled datapoints from the training dataset. The embodiment also includes receiving an instruction to modify the causal network. The embodiment also includes replacing the first query strategy with a second query strategy based on the instruction to modify the causal network. The embodiment also includes identifying, from the training dataset, a second unlabeled datapoint to present for labelling according to the second query strategy. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
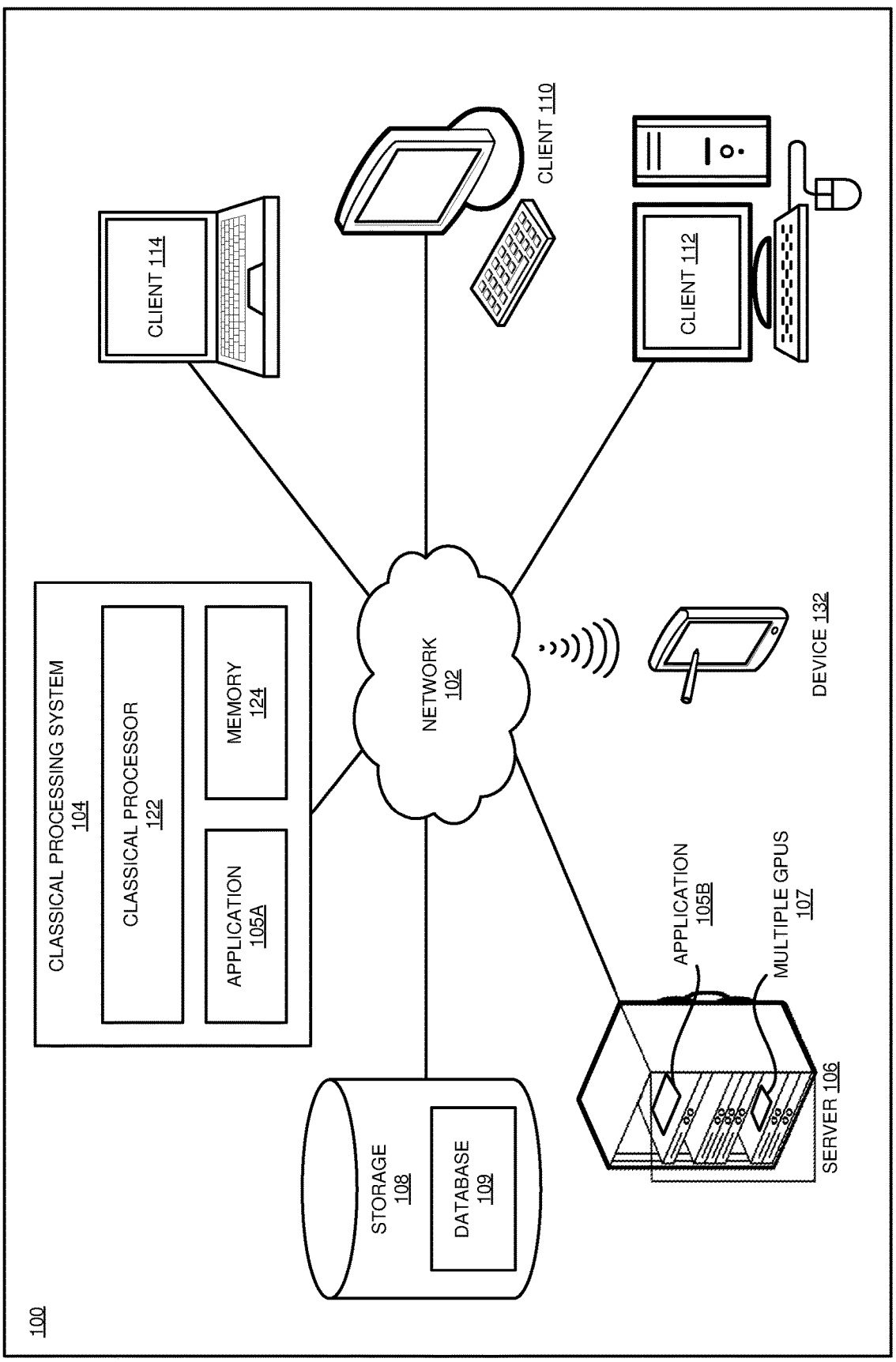
FIG. 1 depicts a block diagram of a network of data processing systems in which illustrative embodiments may be implemented.

Today there are many different machine learning applications that make some type of prediction for a given input value, such as a predicted price or performance value. Machine learning applications use a machine learning model to predict an output data value (y) for a given input data value (x). A machine learning model is created by "training" an algorithm using a dataset referred to as training data.

In some situations, the training data includes labeled datapoints—datapoints that include typical input values and corresponding expected output values—and unlabeled datapoints. When the labeled datapoints are used to train a model, one option is to manually label the unlabeled datapoints, which can be time consuming and prone to human error.

Active learning offers an alternative to manually labeling all of the unlabeled datapoints. In active learning, a query strategy is used to select certain unlabeled datapoints for labeling using an algorithm that identifies unlabeled datapoints based on various criteria. The query strategy will ideally determine which unlabeled datapoints will be most informative if labeled. The labeling is typically performed by a human annotator, referred to as an oracle. The labeled datapoints are then added to the training data for retraining the model.

While active learning can be applied to a variety of data sets and data types, the technique can be more challenging when starting out with a limited amount of training data or when working with a skewed data set. Both cases can occur in various applications. As an example, consider building a spam model on an open discussion platform on the web. The data can be highly skewed, with most examples being non-spam. As another example, applications using active learning to improve the detection of sensitive or offensive content can encounter similar challenges—most data is in the negative class (non-offensive), with a small number of examples in the positive class.

Thus, the decision of which unlabeled data to send as a query for labeling is important in order to adequately cover the feature space and achieve an accurate model. This decision depends on the query strategy. This makes the decision of which query strategy to adopt very important because of its impact on the accuracy of the trained model. For example, some query strategies tend to gravitate towards outliers, and others fail to effectively explore the feature space. The result in either case is usually an inaccurate and error-prone model.

However, selecting a query strategy is difficult for several reasons. Currently there are many different query strategies that have recently been proposed with varying amounts of available research. Also, there are different active learning frameworks—such as pooling and streaming—from which to choose, and further strategy options that propose combinations of these options. This leaves the decision open to speculation or a trial-and-error approach, which can be computationally expensive and time-consuming.

In order to address these technical issues, disclosed embodiments introduce a causal analysis to the active learning cycle that allows the active learning process to be monitored and adjusted while it is in progress. In exemplary embodiments, the active learning training cycle periodically generates a causal network from the labeled data using a causal discovery algorithm, such as the Peter and Clark (PC) algorithm. Each node of the causal network is a feature of the dataset and each edge in the network represents a causal relationship between the respective pair of connected features as reflected in the labeled dataset. The causal relationships include causal relationships inferred by the model.

Exemplary embodiments allow a subject matter expert (SME) to monitor causal connections between features that are established during the training process. The SME is able to view and interact with the causal connections through an interface that displays the causal network. The interface receives feedback from the SME, and the feedback is passed along to the active learning process. The feedback is then used to modify the query strategy and the model. Exemplary embodiments allow the SME remove causal connections that should not be present, add causal connections that should be present, and strengthen or weaken causal connections that are not exerting an appropriate amount of influence on the model. When the SME makes a revision to the causal network, the active learning network changes the query strategy to neutralize the unintended causal relationships while also considering the performance goals.

An embodiment can be implemented as a software application. The application implementing an embodiment can be configured as a modification of an existing active learning system, as a separate application that operates in conjunction with an existing active learning system, a standalone application, or some combination thereof. For example, the application implementing an embodiment can be configured as a modification to add the causal network feedback features to an existing active learning system, as a separate causal network feedback application that operates in conjunction with an existing active learning system, a standalone causal network feedback application, or some combination thereof.

In an embodiment, a model is essentially a formula with a plurality of parameters that were trained by input data. The model is updated using new training data that may be incremental to training data that was previously used to train the model, or may be a replacement for the previously used training data. Depending on the set of input data used to update the model, the parameters may change only slightly, or the parameters may change by large amounts. In an embodiment, the significance of the parameter changes are evaluated to determine whether the updated model constitutes a major or minor change.

An embodiment analyzes an output set of an updated model for comparison with an output set of the model prior to the update and determines the significance of the update based on the comparison results. An embodiment includes one or more threshold values that are used to classify the significance of the update, for example as a major or minor update. Embodiments are not limited to major and minor update classifications, but instead may have any desired number of such classifications. For example, an embodiment includes nominal, minor, moderate, and major classifications.

In an exemplary embodiment, an application specifies an "original" model to update. For example, the original model may be designated for an update in order to make some change to the model, such as adding or removing one or more features, which influences the original model to emerge into a new version as an updated model.

In an exemplary embodiment, the model is a linear regression model. In some such embodiments, the application trains the linear regression model using a training process that includes the use of training data. As a non-limiting example, in an embodiment, if the model is a new model (i.e., a first generated model), the application initializes the model parameters to some initial values, which may be random or selected values, whereas if the model is an original model being updated, the application may use the existing model parameters. The application then inputs the parameters into an algorithm selected for the model. The application then uses the algorithm with the parameters to generate predictions for training input values in the training data. The application then calculates residuals (also referred to as error terms), which include the differences between each output from the model being trained and a corresponding training output value from the training data. The residuals provide a series of error values. In an embodiment, the application uses a least squares technique, where each residual value is squared and summed to calculate a residual sum of squares (RSS). The parameters are then adjusted, and the training input values are inputted to the model again, resulting in another RSS value for the adjusted parameters.

In some embodiments, the application continues using an iterative process of adjusting parameters and inputting training input data with the goal of minimizing the RSS value. In some embodiments, the application selects parameters that minimize the RSS value by defining a cost function and minimizing it via gradient descent. In some embodiments, the cost function is the same as the RSS, and the gradient descent changes parameter values by taking a partial derivative of the parameters to get the slope of the cost function, which is used to update the parameter values until the slope can no longer provide a direction for a next parameter set, indicating that the RSS has been minimized.

In exemplary embodiments, an active learning manager triggers a training module to train a machine learning model according to an active learning cycle. The active learning cycle may be a pooling or streaming active learning cycle. In exemplary embodiments, the training module trains a machine learning model using data from a training dataset stored at a data source. The data source may be local, remote, or distributed among one or more local and/or remote data storage devices. In exemplary embodiments, the model is a machine learning classifier model, but embodiments apply equally to other types of models.

In exemplary embodiments, a query strategy module identifies an unlabeled datapoint from the training dataset according to a query strategy. For example, in some such embodiments, the query strategy module employs a query strategy that identifies an unlabeled datapoint for a query based on a confidence score, but other query strategies may be used. In exemplary embodiments, a query module generates a query using the unlabeled datapoint identified by the query strategy module and provides the query to an oracle via an annotation interface. The annotation interface may include a graphical user interface or any other desired interface that allows for interaction with a human to allow for annotation. In exemplary embodiments, the oracle labels the received datapoints and returns them via the annotation interface for use by the training module to retrain the machine learning model.

Periodically during the active learning process, for example when the active learning process has completed either a predefined number of queries or processed a predefined number of datapoints, the training module triggers a causal discovery algorithm module to use a causal discovery algorithm to generate a causal network of features based on the model data already labeled. A causality interface presents the SME with the causal network to elicit feedback.

The causality interface may include a graphical user interface or any other desired interface that allows for interaction with a human to allow for review and feedback in connection with a causal network. In actual implementations, the causality interface and the annotation interface may share a single physical interface device or may use different interface devices.

The SME provides feedback on the causal network based on the domain knowledge and experience of the SME about the causal relationships between pairs of features. The SME then corrects the causal network by modifying the associated edge, for example by adding, strengthening, deleting, or diluting the edge. Such intervention will change the query strategy such that it will aim to neutralize the unintended causal relationships while also considering the performance goal.

The query strategy module uses any modification instructions provided as feedback from the SME to generate a new query strategy that overrides the prior query strategy. In exemplary embodiments, the new query strategy includes a ranking strategy based on the modifications stemming from the SME feedback.

If the feedback from the SME does not include modification instructions, then the active learning manager proceeds with the same query model as before generating the most recent causal network. The process of generating causal networks for the SME repeats until the SME is satisfied with the causal network.

Once the active learning manager has completed either a predefined number of cycles or when the performance of the machine learning model reaches some threshold, the active learning manager stops the active learning process and the resulting model is available to download, transmit, or otherwise make available for runtime use.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
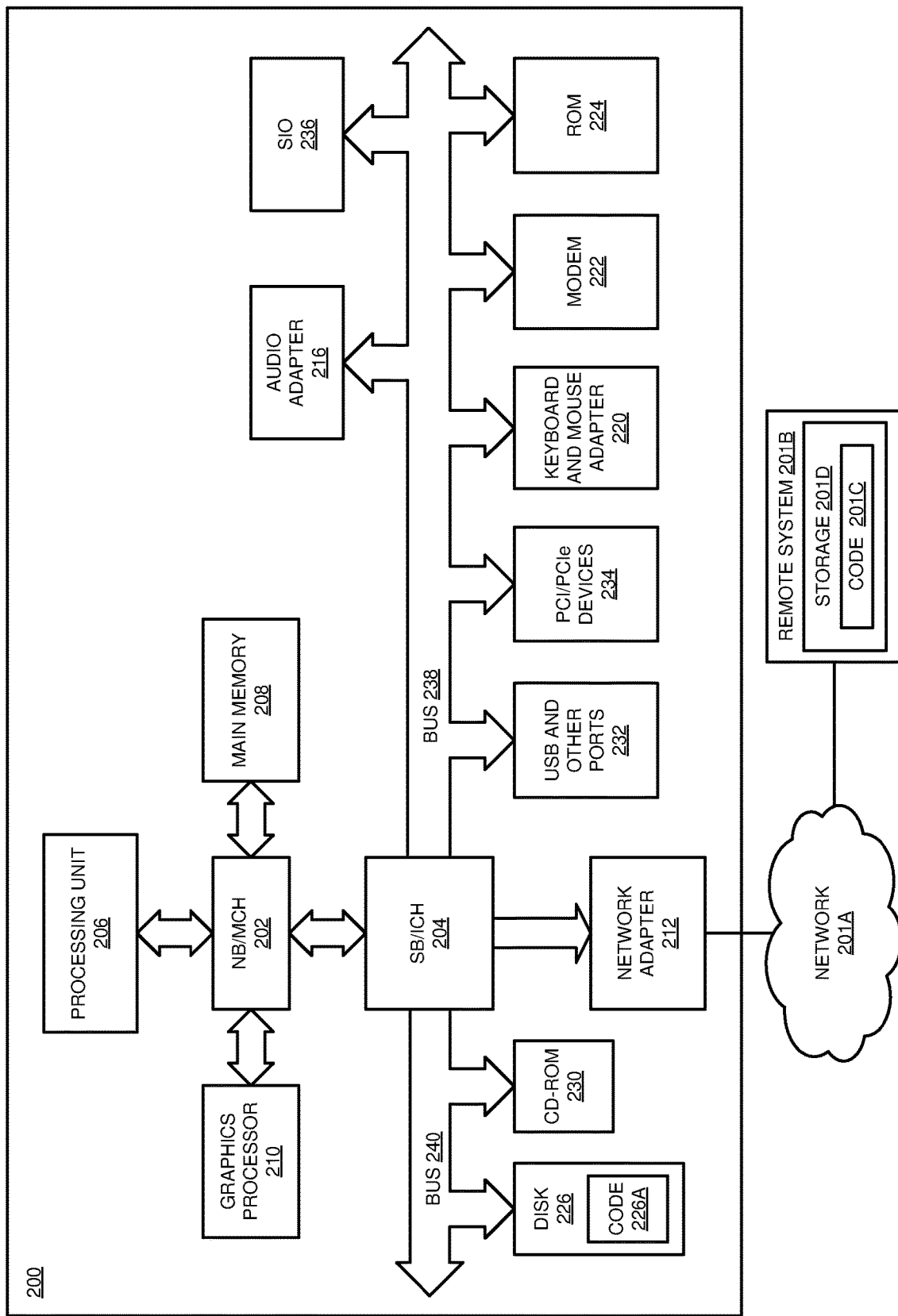
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes an application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B, such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of application 105A of data processing system 104 and application 105B of server 106 implements an embodiment of an active learning application as described herein. In a particular embodiment, the active learning application is implemented using one of application 105A and application 105B within a single server or processing system. In another particular embodiment, the active learning application is implemented using both application 105A and application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto.

Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A, 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
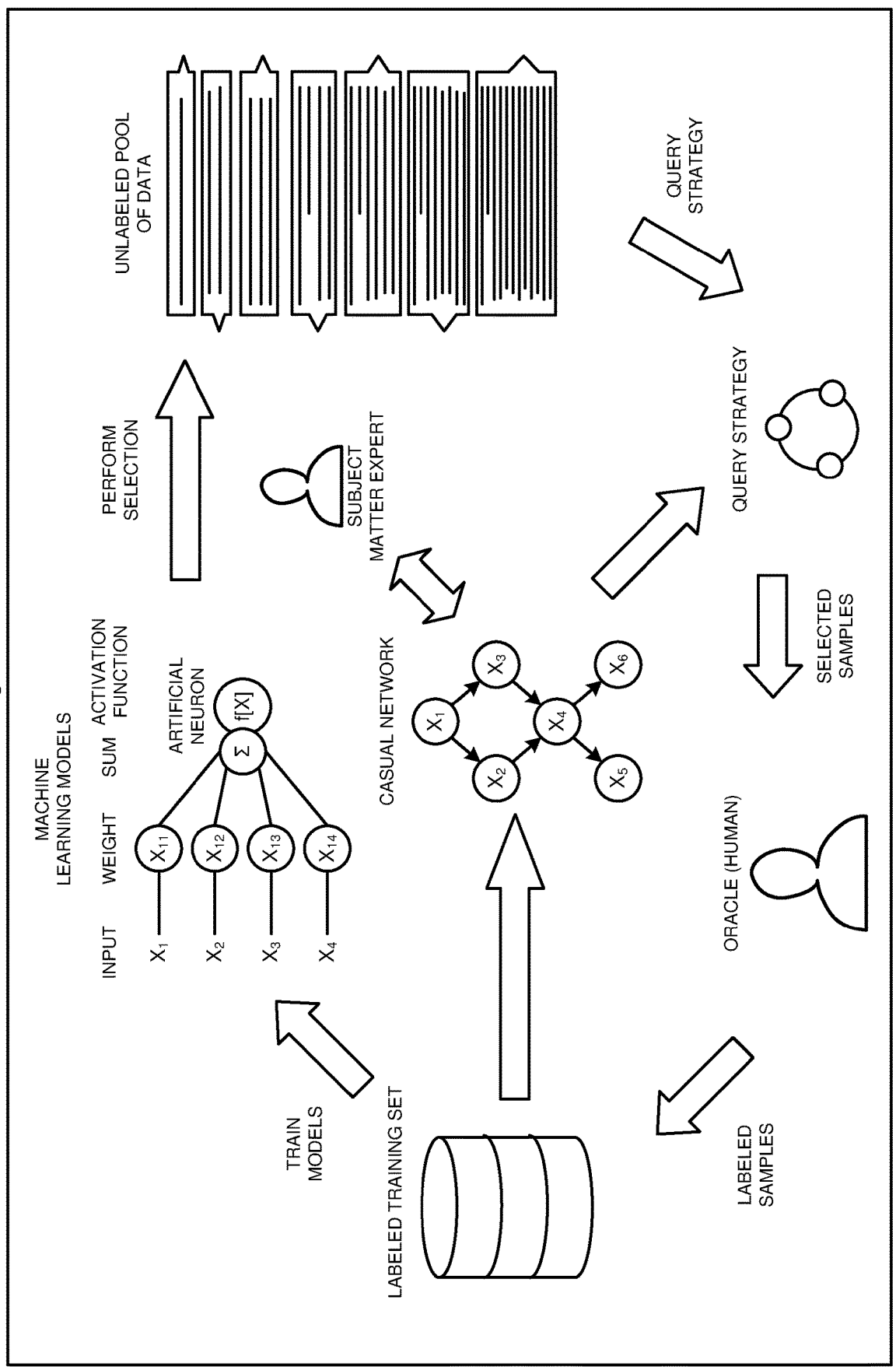
FIG. 3 depicts an example active learning cycle for a pool of training data in accordance with an illustrative embodiment.

With reference to FIG. 3, this figure depicts an example active learning cycle for a pool of training data in accordance with an illustrative embodiment. In a particular embodiment, the active learning cycle shown in FIG. 3 is performed by application 105A, 105B of FIG. 1.

In the illustrated embodiment, an active learning cycle includes a machine learning model that is supplied with a large pool or stream of labeled and unlabeled data or samples, also referred to as datapoints. The active learning cycle processes the labeled data to train a machine learning model. Periodically during this training process, the active learning cycle selects one or more unlabeled datapoints to present to an oracle (human annotator) to request a label. The active learning cycle attempts to detect, based on a query strategy, which unlabeled sample(s) will be most informative if labeled by an oracle. A human oracle (also referred to as annotator) is then shown the selected sample(s) and gives them labels. These labeled samples are added to the training data for retraining the model. The decision of which unlabeled data to send to the oracle depends on the query strategy. The query strategy is an algorithm that adaptively decides whether to query the oracle for an unlabeled datapoint. There are many different query strategies that are known. The decision of which query strategy to adopt is important because it impacts the efficiency of the model training process and potentially the accuracy of the model. For example, some query strategies tend to gravitate towards outliers or fail to effectively explore the feature space, resulting in an error-prone model. However, deciding on a strategy is difficult because there are so many that have been proposed in a short amount of time, and still further strategy options proposing combinations of known strategies.

In order to address these technical issues, disclosed embodiments include a causal analysis that is helpful in monitoring and adjusting the data produced during the training process that is affected by the model strategy. In the illustrated embodiment, the active learning training cycle periodically generates a causal network from the labeled data using a causal discovery algorithm, such as the Peter and Clark (PC) algorithm. Each node of the causal network is a feature of the dataset and each edge in the network represents a causal relationship between the respective pair of connected features as reflected in the dataset already labeled. Exemplary embodiments allow a subject matter expert (SME) to monitor causal connections between features that are established during a training process. The SME is able to interact with the causal connections through an interface. The interface interprets the SME's interactions, and, in response, the active learning process modifies the query strategy and the model. The SME is able to remove causal connections that should not be present, add causal connections that should be present, and strengthen or weaken causal connections that are not exerting an appropriate amount of influence on the model. When the SME makes a revision to the causal network, the active learning network changes the query strategy to neutralize the unintended causal relationships while also considering the performance goals.

Figure 4:
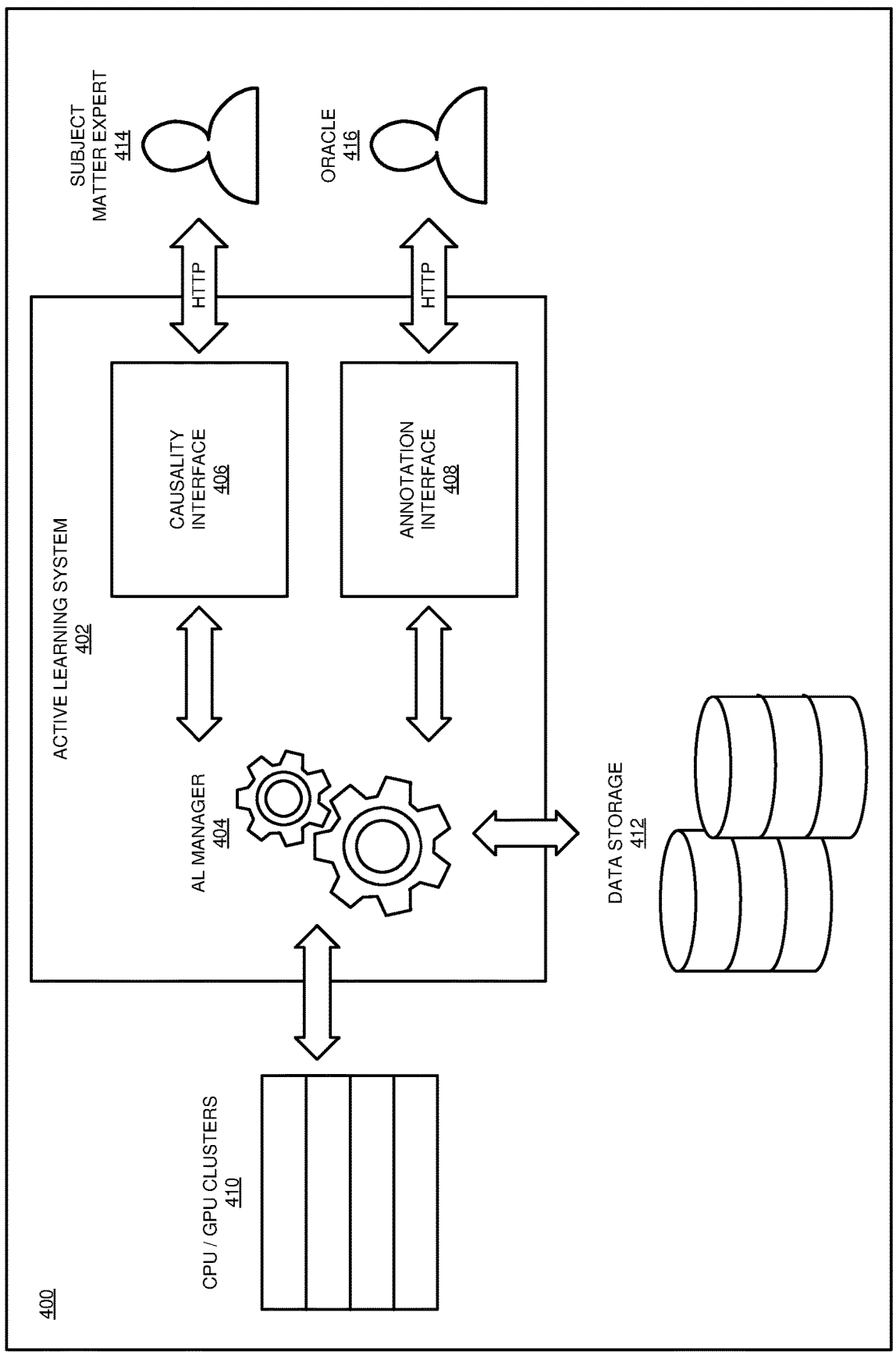
FIG. 4 depicts a configuration for an active learning system in accordance with an illustrative embodiment.

With reference to FIG. 4, this figure depicts a configuration 400 for an active learning system 402 in accordance with an illustrative embodiment. In a particular embodiment, the active learning system 402 shown in FIG. 4 is performed by application 105A, 105B of FIG. 1.

In the illustrated embodiment, the active learning system 402 includes an active learning manager 404, a causality interface 406, and an annotation interface 408, as well as local and/or remote elements of a compute cluster 410 and local and/or remote elements of a data storage 412. In alternative embodiments, the active learning system 402 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the active learning system 402 includes an active learning manager 404 that orchestrates an active learning cycle like the one shown in FIG. 3. In some embodiments, the active learning system 402 includes a web server that hosts the causality interface 406 used by SME 414 and annotation interface 408 used by oracle 416. There are two roles of users that interact with the system (SME 414 and oracle 416), but they may in reality be the same person or people.

In some embodiments, the data storage 412 stores training data that includes labeled and unlabeled datapoints. Embodiments include datapoints for continuous or categorical variables. In some embodiments, when unlabeled datapoints from the training data have been selected in accordance with a query strategy to be labeled, the oracle 416 uses the annotation interface 408 to add labels. Alternatively, the oracle 416 can download the unlabeled datapoints and annotate them using some external software, such a word processor or spreadsheet. Once annotated, the labeled datapoints are saved in the data storage 412 and the active learning cycle continues.

Periodically during the active learning process, for example when the active learning system 402 has completed either a predefined number of queries or processed a predefined number of datapoints, the active learning manager 404 uses a causal discovery algorithm to generate a causal network of features based on the datapoints already labeled. The causality interface 406 presents the SME 414 with the causal network to elicit feedback based on the domain knowledge and experience of the SME about the causal relationships between pairs of features. The SME 414 then makes corrections, if necessary, to the causal network by manipulating or modifying one or more edges in the network, for example by adding, strengthening, deleting, or diluting the edge(s). Such intervention will change the query strategy such that it will aim to neutralize the unintended causal relationships while also considering the performance goal.

The active learning manager 404 uses modification instructions provided as feedback from the SME 414 to implement a new query strategy that overrides the prior query strategy. If the feedback from the SME 414 does not include modification instructions, then the active learning manager 404 proceeds without changing the query strategy. The process of generating causal networks for the SME 414 repeats until the SME 414 is satisfied with the causal network.

The active learning process continues until it has satisfied a condition or conditions for completion. For example, the process may continue until a predefined number of cycles have been performed or until the model performance reaches some predefined threshold value. Once the active learning cycle is completed, the resulting model is stored in data storage 412, where it is available for runtime use.

Figure 5:
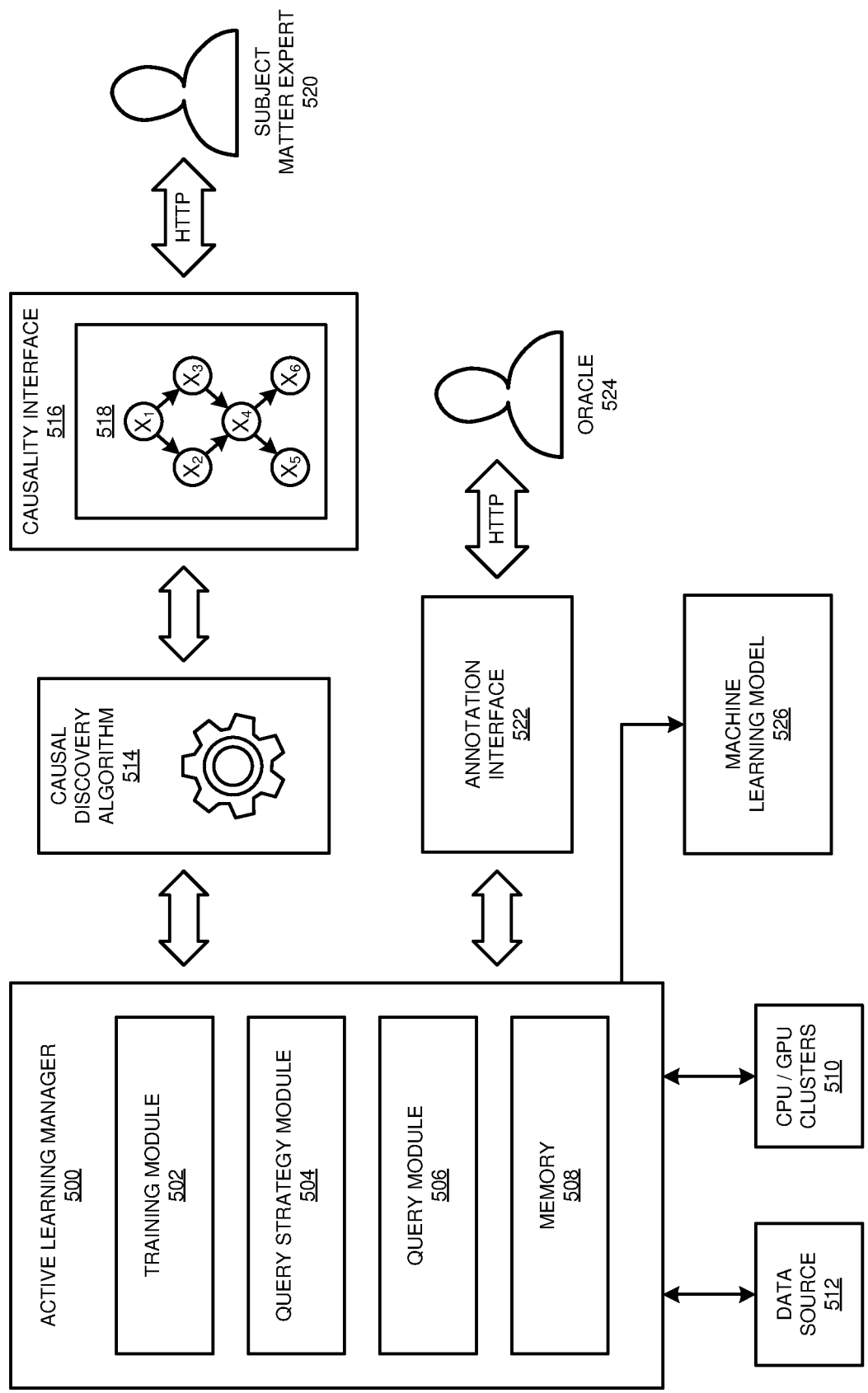
FIG. 5 depicts an active learning manager for an active learning system in accordance with an illustrative embodiment.

With reference to FIG. 5, this figure depicts an active learning manager 500 for an active learning system in accordance with an illustrative embodiment. In a particular embodiment, the active learning manager 500 shown in FIG. 5 is an example of active learning manager 404 shown in FIG. 4.

In the illustrated embodiment, the active learning manager 500 includes a training module 502, a query strategy module 504, a query module 506, and computer memory 508, as well as local and/or remote elements of a causal discovery algorithm module 514, local and/or remote elements of a causality interface 516, local and/or remote elements of an annotation interface 522, local and/or remote elements of a data source 512, and local and/or remote elements of a compute cluster 510. In alternative embodiments, the active learning manager 500 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications. For example, in some embodiments, the active learning manager 500 includes one or more of the causal discovery algorithm module 514, the causality interface 516, and the annotation interface 522.

In the illustrated embodiment, the active learning manager 500 triggers the training module 502 to train a machine learning model 526 according to an active learning cycle, for example an active learning cycle as shown in FIG. 3. In some embodiments, the training module 502 trains a machine learning model 526 using data from a training dataset stored at the data source 512. In some embodiments, the machine learning model 526 is a machine learning classifier model. In some embodiments, the query strategy module 504 identifies an unlabeled datapoint from the training dataset according to a query strategy. For example, in some such embodiments, the query strategy module 504 employs a query strategy that identifies an unlabeled datapoint for a query based on a confidence score. In some embodiments, the query module 506 generates a query using the unlabeled datapoint identified by the query strategy module 504 and provides the query to the oracle 524 via the annotation interface 522. In the illustrated embodiment, the oracle labels the received datapoint and returns it via the annotation interface 522 for use by the training module 502 to train the machine learning model 526.

Periodically during the active learning process, for example when the active learning manager 500 has completed either a predefined number of queries or processed a predefined number of datapoints, the training module 502 triggers the causal discovery algorithm module 514 to use a causal discovery algorithm to generate a causal network causal network 518 of features based on the model data already labeled. The causality interface 516 presents the SME 520 with the causal network to elicit feedback based on the domain knowledge and experience of the 520 SME about the causal relationships between pairs of features. The SME 520 then corrects the causal network by modifying the associated edge, for example by adding, strengthening, deleting, or diluting the edge. Such intervention will change the query strategy such that it will aim to neutralize the unintended causal relationships while also considering the performance goal.

The query strategy module 504 uses any modification instructions provided as feedback from the SME 520 to generate a new query strategy that overrides the prior query strategy. In some embodiments, the new query strategy includes a ranking strategy as discussed below with reference to FIG. 6.

If the feedback from the SME 520 does not include modification instructions, then the active learning manager 500 proceeds with the same query model as before generating the most recent causal network. The process of generating causal networks for the SME 520 repeats until the SME 520 is satisfied with the causal network.

Once the active learning manager 500 has completed either a predefined number of cycles or when the performance of the machine learning model 526 reaches some threshold, the active learning manager 500 stops the active learning process and the resulting model 526 is available to download, transmit, or otherwise make available for runtime use.

Figure 6:
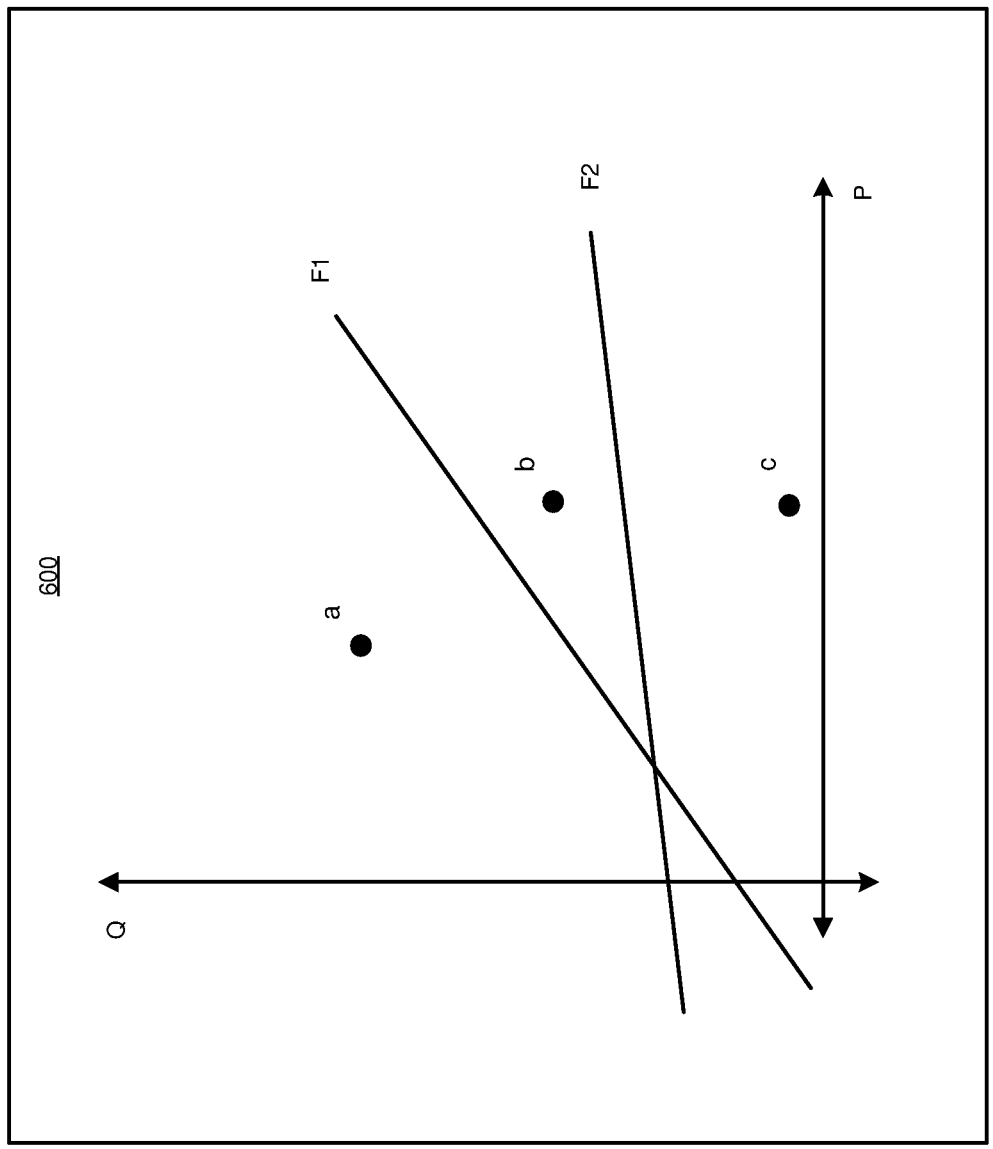
FIG. 6 depicts a graph of data used for a ranking metric in accordance with an illustrative embodiment.

With reference to FIG. 6, this figure depicts a graph of data used for a ranking metric in accordance with an illustrative embodiment. As an example, data plotted in graph 600 includes datapoints a-c from the training data stored in data source 512 and distributions F1 and F2 from the machine learning model 526 being trained by the training module 502 in FIG. 5.

In some embodiments, the SME 520 provides feedback by choosing to add or delete an edge or by choosing to increase or decrease the strength of an existing edge. In some embodiments, the SME 520 also has the option of providing feedback by choosing to change the underlying distribution behind an edge in the causal network. All of these interactions involve modifying the existing relationship between the connecting nodes. In some embodiments, choosing a query strategy that accounts for all of these operations involves selecting unlabeled datapoints such that the current distribution between two variables (i.e., features) tends towards a new distribution with every query. For example, for the data plotted in FIG. 6, the SME 520 interacts with an edge that connects two variables P and Q whose relationship prior to the interaction by the SME 520 is represented by the function F1. Based on the type of user interaction, the intended or target relationship is represented by another function F2.

If the causal network is modeled using linear structural equation models, F1 and F2 will be linear functions as shown in FIG. 6. Irrespective of the type of interaction, F1 can be obtained by fitting a linear model between P and Q based on the current labeled dataset. If the SME 520 wishes to delete the edge between P and Q, F2 will be represented as a line parallel to the P axis, i.e., Q=constant. Conversely, if SME 520 wishes to add an edge between P and Q where P and Q were previously disconnected, F1 (prior to the interaction) can be approximated by Q=constant.

If P is a categorical variable, it can be converted into an n dimensional one-hot encoding vector, and SME 520 can specify for each i=1 . . . n, when Pi=1, the likely value of Q. If Q is a categorical variable with multiple levels, there would be one causal network for each level Qi, and the SME 520 can modify each network separately.

In the example plotted in FIG. 6, in order to enforce a modification instruction from the SME 520 feedback, initial distribution F1 between P and Q needs to be changed to F2. In order to achieve this, a ranking metric R is employed by the query strategy module 504 that ranks unlabeled samples based on the difference of their distances from F1 and F2 in decreasing order. For each unlabeled sample x, its distance to F1 and F2 is computed using some distance metric d. Thereafter, each sample is assigned a ranking score R(x)=d(x, F1)−d(x, F2). Samples with the highest score are chosen for labeling. This ranking metric prioritizes unlabeled samples that are closer to the target distribution F2 relative to the original distribution F1 and vice versa. Samples with the largest difference are chosen so that the transition from F1 to F2 occurs in minimum number of queries. For samples a, b, and c shown in FIG. 6, sample c will be ranked the highest followed by b and a. In some embodiments, there can be multiple ranking metrics R corresponding to each SME 520 interaction that will be merged into an aggregate ranking. Once F1 has converged to F2, R(x) will be close to 0 for all x to ensure that the ranking metric does not impact aggregate ranking past convergence.

In some embodiments, the new query strategy is an aggregate query strategy that merges the result of each interaction and modification instruction from the SME 520 in an aggregate ranking for selecting a next unlabeled datapoint for review by the oracle 524. For example, in an embodiment the query strategy module 504 employs a default query strategy S, such as uncertainty sampling, at the beginning of the active learning process. The query strategy module 504 continues to employ strategy S until SME 520 supplies modification instructions for an edge in the causal network causal network 518. The modification instructions from the SME 520 triggers the query strategy module 504 to change the query strategy to a new strategy S', which is based on strategy S combined with new objectives corresponding to the modification instructions from the SME 520. Thereafter, query module 506 performs queries according to the new query strategy S'. In some embodiments, each new objective 'i' corresponding to a modification instruction from the SME 520 is added to the aggregate ranking metric each time the SME 520 provides modification instructions. Each new objective can be represented by a corresponding ranking metric Ri. There can be multiple ways to merge S and Ri to achieve S'. In an exemplary embodiment, a combined ranking metric is achieved by a linear combination of S and Ri according to expression (1) below.

Aggregate Ranking metric (AR)=α*Default query metric+Σβi*Ri (1)

In expression (1), α and βi are user-specified constants that represent weights given to ranking objectives. If S is uncertainty-based sampling, the default ranking metric can be entropy, distance to boundary, etc. If α=0, then the query strategy is totally focused on materializing the changes specified by the user while sacrificing performance. If βi=0 for all i, then the query strategy is same as default query strategy. Similarly, the SME 520 can specify different values for α, βi to satisfy desired requirements.

Figure 7:
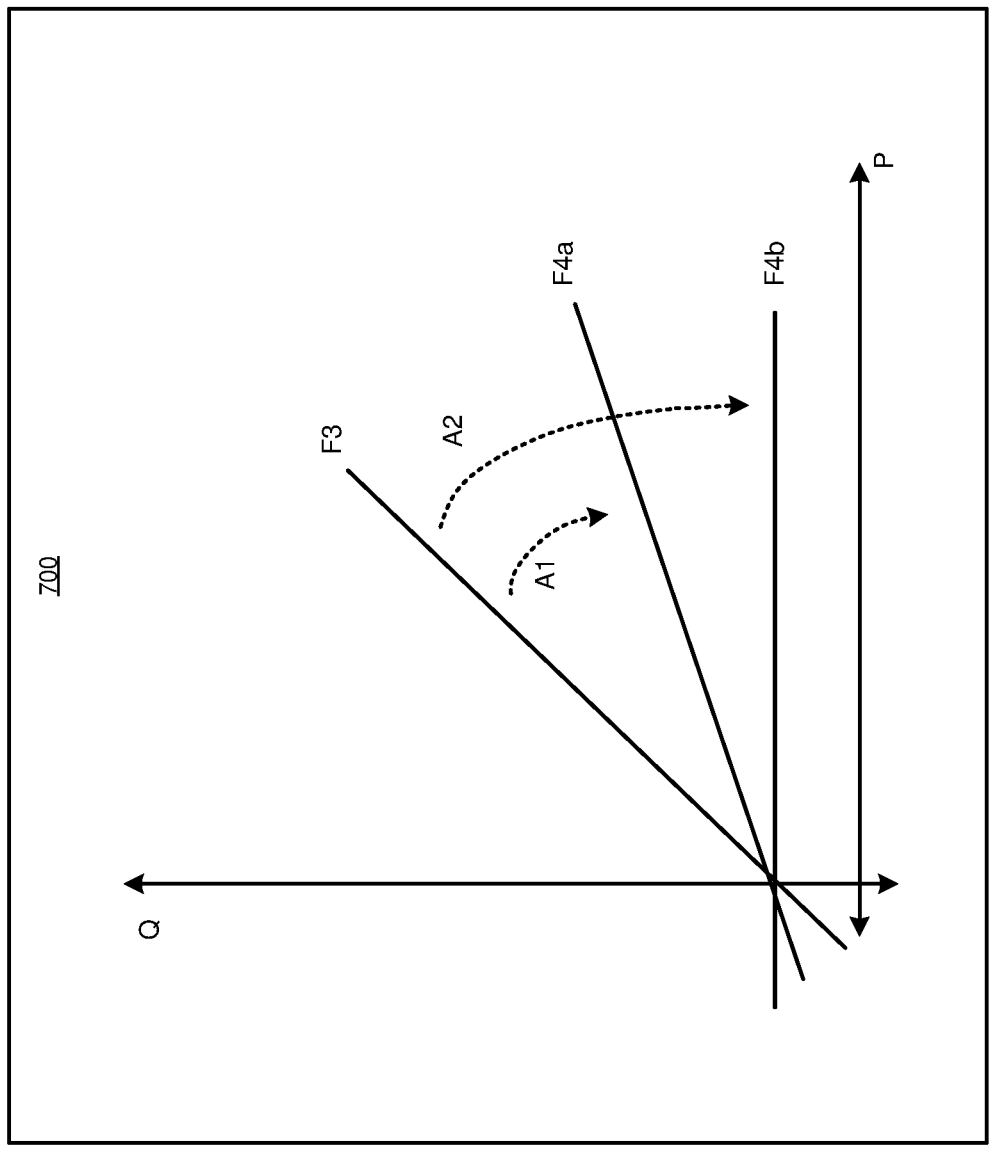
FIG. 7 depicts a graph of data used for modifying a query strategy based on a modification instruction to delete or weaken an edge from an SME in accordance with an illustrative embodiment.

With reference to FIG. 7, this figure depicts a graph of data used for modifying a query strategy based on a modification instruction to delete or weaken an edge from an SME 520 in accordance with an illustrative embodiment. Specifically, arrow A1 shows weakening an edge by reducing the slope of a distribution from F3 to that of F4a, and arrow A2 shows deleting an edge by reducing the slope of a distribution from F3 to that of F4b. As an example, data plotted in graph 700 includes distributions F3, F4a, and F4b from the machine learning model 526 being trained by the training module 502 in FIG. 5.

Deletion of an edge P to Q in the causal network signify the intent of the SME 520 of making variables P and Q statistically independent from each other. Similarly, dilution of an edge P to Q signify the intent of the SME 520 to make Q less statistically dependent on P.

If causal network is modeled using linear structural equation models, the causal link between two adjacent nodes P and Q can be represented as Q=a*P+constant where P is the only node to have an outgoing edge to Q. The strength of this causal relationship is represented by |a|. Higher values of |a| represent stronger dependences. To delete the edge P to Q, the strength of the causal relationship i.e., |a| should come down to 0. Hence, the target relationship F4b between P and Q can be represented as Q=constant. This is demonstrated in FIG. 7 where F2 is shown as a line parallel to the x axis (shown as P axis).

For dilution, the strength of the causal relationship should come down to |a'| where a' is specified by the user and |a'|<|a|. Hence, the target relationship F4a can be represented as Q=a'*P+constant. This scenario is shown in FIG. 7 where F4a is represented as a line which has a non-zero slope smaller than initial relation F1. Having target distribution figured out for both operations, the F1 can be calculated using the current labeled dataset. Thereafter, we can simply plug in F1 and F4b to previously specified query strategy to enforce the transition from F1 to F2 with every new query.

Figure 8:
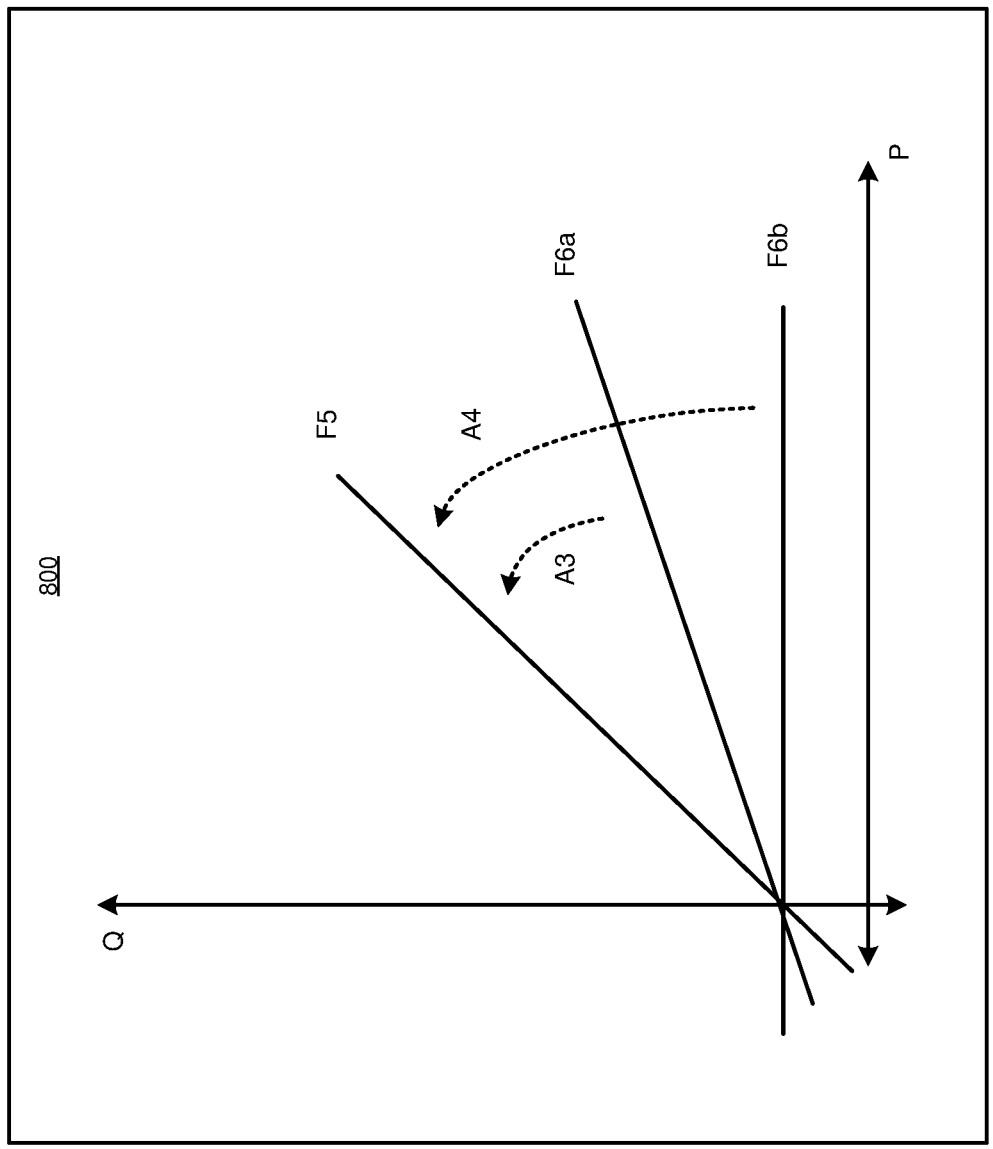
FIG. 8 depicts a graph of data used for modifying a query strategy based on a modification instruction to add or strengthen an edge from an SME in accordance with an illustrative embodiment.

With reference to FIG. 8, this figure depicts a graph of data used for modifying a query strategy based on a modification instruction to add or strengthen an edge from an SME 520 in accordance with an illustrative embodiment. Specifically, arrow A3 shows strengthening an edge by increasing the slope of a distribution to F5 from that of F6a, and arrow A4 shows adding an edge by increasing the slope of a distribution to F5 from that of F6b. As an example, data plotted in graph 800 includes distributions F5, F6a, and F6b from the machine learning model 526 being trained by the training module 502 in FIG. 5.

Adding an edge P to Q between two previously unconnected nodes P and Q signify the intent of SME 520 to establish statistical dependence between two independent variables. Similarly, strengthening an edge represents having a stronger dependence relation than before. In the case where the SME 520 adds an edge, the current relationship F6b can be represented as Q=constant as shown in FIG. 8. Here, F6b depicted as a line parallel to the x-axis (labeled as P axis in FIG. 8) because the regression coefficient for P is 0 given that P and Q are statistically independent. Apart from specifying the edge to be added, the SME 520 will also provide F5, i.e., the SME 520 intended to target the relationship between P and Q. F5 can be a function like Q=3P+1.

In the case where the SME 520 strengthens an edge, F6a will be a line with non-zero slope because P and Q are statistically dependent to begin with. The SME 520 will specify the intended new strength of dependence, which will be used to evaluate F5. Lastly, F6a and F5 are used in an updated query strategy, resulting in an observable increase in strength in the dependence between P and Q, which will gradually increase during subsequent queries until reaching the desired magnitude as specified by F5.

Figure 9:
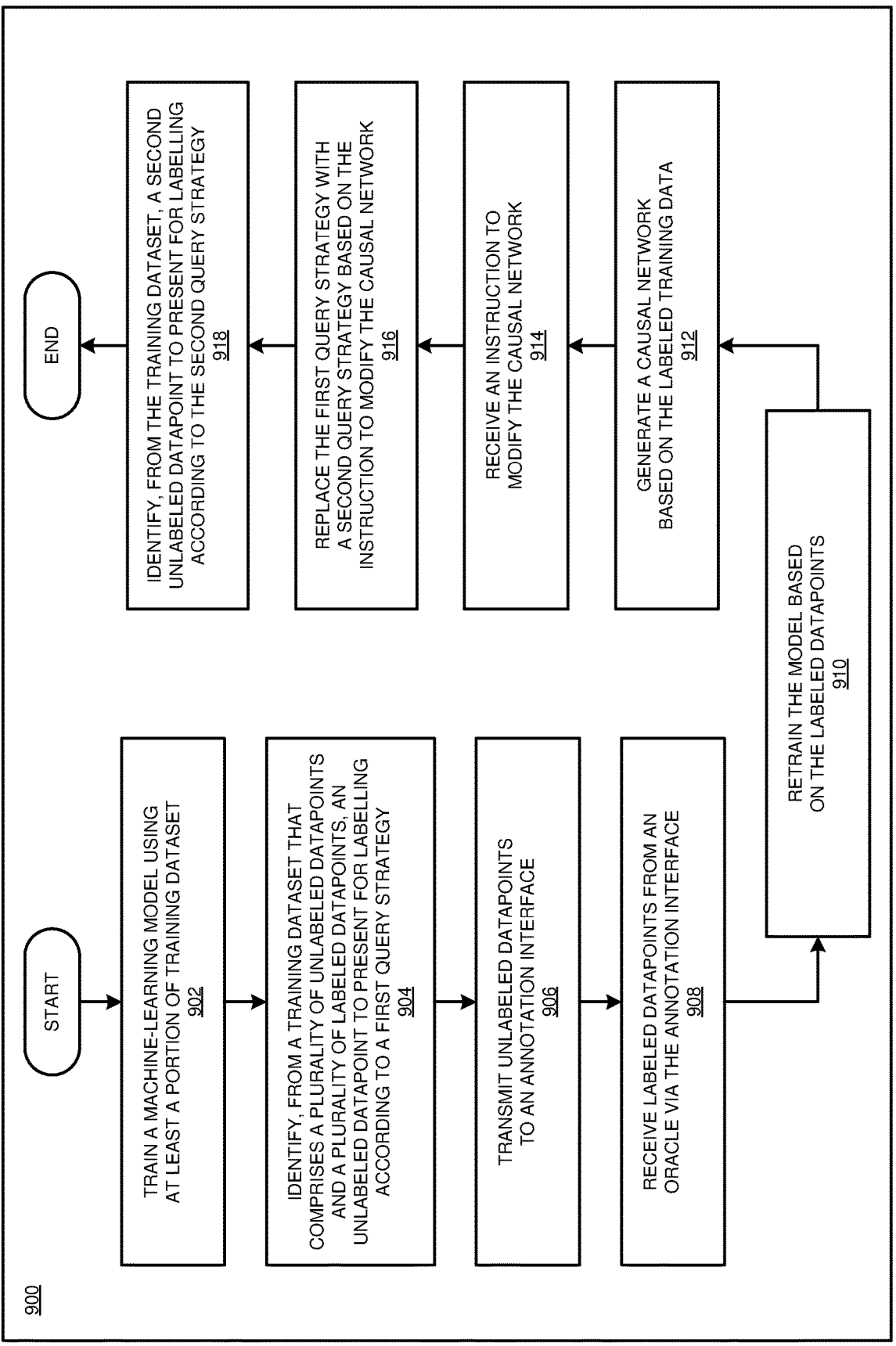
FIG. 9 depicts a flowchart of an example active learning process in accordance with an illustrative embodiment.

With reference to FIG. 9 this figure depicts a flowchart of an example active learning process 900 in accordance with an illustrative embodiment. In a particular embodiment, the active learning system 402 of FIG. 4 or the active learning manager 500 of FIG. 5 carries out the process 900.

In an embodiment, at block 902, the process trains a machine learning model using a training dataset. Next, at block 904, the process identifies, from a training dataset that comprises a plurality of unlabeled datapoints and a plurality of labeled datapoints, an unlabeled datapoint to present for labelling according to a first query strategy. Next, at block 906, the process transmits the unlabeled datapoint to an annotation interface, where an oracle can review and label the datapoint. Next, at block 908, the process receives the datapoint from the annotation interface as a labeled datapoint. Next, at block 910, the process retrains the model based on the labeled datapoint. Next, at block 912, the process generates a causal network based on the labeled data. Next, at block 914, the process receives an instruction from an SME to modify the causal network. Next, at block 916, the process replaces the first query strategy with a second query strategy based on the instruction from the SME to modify the causal network. In some embodiments, the process modifies the model based on the instruction from the SME. Next, at block 918, the process identifies, from the training dataset, a second unlabeled datapoint to present for labelling according to the second query strategy.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    identifying, from a training dataset for training a model, a first unlabeled datapoint to present for labelling according to a first query strategy;
    issuing a query requesting a label for the first unlabeled datapoint;
    receiving a labeled datapoint in response to the query, the labeled datapoint comprising the first unlabeled datapoint as labeled by an oracle;
    using causal discovery on labeled datapoints from the training dataset to determine a plurality of features and causal relationships amongst the plurality of features;
    generating a causal network based on the labeled datapoints from the training dataset and the causal relationships, a causal relationship being between at least a pair of features from the plurality of features;
    receiving at least an instruction to modify the causal network, modifying the causal network comprising modifying the causal relationship between the pair of features;
    replacing the first query strategy with a second query strategy based on a plurality of modification instructions to modify the causal network, the second query strategy merging at least a ranking corresponding to a result from each modification instruction in an aggregate ranking of results; and
    identifying, from the training dataset, a second unlabeled datapoint to present for labelling according to the second query strategy, the second unlabeled datapoint being chosen based on the aggregate ranking of results and due at least in part to a distance of the second unlabeled datapoint from a target distribution associated with the first query strategy and a closeness to a target distribution associated with the second query strategy.

2. The computer-implemented method of claim 1, further comprising:
    training the model using labeled datapoints from the training dataset.

3. The computer-implemented method of claim 2, further comprising:
    repeating, periodically during the training of the model, the generating of the causal network based on labeled datapoints from the training dataset.

4. The computer-implemented method of claim 2, further comprising:
    retraining the model based on the labeled datapoint received from the oracle.

5. The computer-implemented method of claim 1, wherein the identifying of the first unlabeled datapoint is based on a confidence score.

6. The computer-implemented method of claim 1, wherein the issuing of the query comprises transmitting the first unlabeled datapoint to an annotation interface.

7. The computer-implemented method of claim 1, further comprising:
    providing the causal network to a subject matter expert via a causality interface.

8. The computer-implemented method of claim 7, wherein the receiving of an instruction to modify the causal network comprises receiving the instruction via the causality interface.

9. The computer-implemented method of claim 1, wherein the instruction to modify the causal network comprises instructions for modifying a causal link between the pair of features in the causal network.

10. The computer-implemented method of claim 9, further comprising:
    adjusting, responsive to receiving the instruction to modify the causal network, a weight value associated with the pair of features in the model.

11. The computer-implemented method of claim 10, wherein the adjusting of the weight value comprises adjusting a coefficient value such that a first distribution involving the pair of features changes to a second distribution.

12. The computer-implemented method of claim 11, wherein the second query strategy comprises:
    calculating, for each of the unlabeled datapoints, a respective difference value based on a difference between a first distance from a respective one of the unlabeled datapoints to the first distribution and a second distance from the respective one of the unlabeled datapoints to the second distribution; and
    ranking the unlabeled datapoints according to respective difference values.

13. The computer-implemented method of claim 1, further comprising each modification instruction corresponding to a separate result that is associated with multiple rankings, the multiple rankings including at least one of entropy and distance to boundary, and the multiple rankings being merged into the aggregate ranking of results.

14. A computer program product comprising one or more computer readable storage media, and program instructions collectively stored on the one or more computer readable storage media, the program instructions executable by a processor to cause the processor to perform operations comprising:
    identifying, from a training dataset for training a model, a first unlabeled datapoint to present for labelling according to a first query strategy;
    issuing a query requesting a label for the first unlabeled datapoint;
    receiving a labeled datapoint in response to the query, the labeled datapoint comprising the first unlabeled datapoint as labeled by an oracle;

periodically using causal discovery on labeled datapoints from the training dataset to determine a plurality of features and causal relationships amongst the plurality of features;
generating a causal network based on the labeled datapoints from the training dataset and the causal relationships, a causal relationship being between at least a pair of features from the plurality of features;
receiving at least an instruction to modify the causal network, modifying the causal network comprising modifying the causal relationship between the pair of features;
replacing the first query strategy with a second query strategy based on a plurality of modification instructions to modify the causal network, the second query strategy merging at least a ranking corresponding to a result from each modification instruction in an aggregate ranking of results; and
identifying, from the training dataset, a second unlabeled datapoint to present for labelling according to the second query strategy, the second unlabeled datapoint being chosen based on the aggregate ranking of results and due at least in part to a distance of the second unlabeled datapoint from a target distribution associated with the first query strategy and a closeness to a target distribution associated with the second query strategy.

15. The computer program product of claim 14, wherein the stored program instructions are stored in a computer readable storage device in a data processing system, and wherein the stored program instructions are transferred over a network from a remote data processing system.

16. The computer program product of claim 14, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

17. The computer program product of claim 14, wherein the instruction to modify the causal network comprises instructions for modifying a causal link between a pair of features in the causal network.

18. The computer program product of claim 17, further comprising:
adjusting, responsive to receiving the instruction to modify the causal network, a weight value associated with the pair of features in the model.

19. A computer system comprising a processor and one or more computer readable storage media, and program instructions collectively stored on the one or more computer readable storage media, the program instructions executable by the processor to cause the processor to perform operations comprising:
identifying, from a training dataset for training a model, a first unlabeled datapoint to present for labelling according to a first query strategy;
issuing a query requesting a label for the first unlabeled datapoint;
receiving a labeled datapoint in response to the query, the labeled datapoint comprising the first unlabeled datapoint as labeled by an oracle;
periodically using causal discovery on labeled datapoints from the training dataset to determine a plurality of features and causal relationships amongst the plurality of features;
generating a causal network based on the labeled datapoints from the training dataset and the causal relationships, a causal relationship being between at least a pair of features from the plurality of features;
receiving at least an instruction to modify the causal network, modifying the causal network comprising modifying the causal relationship between the pair of features;
replacing the first query strategy with a second query strategy based on a plurality of modification instructions to modify the causal network, the second query strategy merging at least a ranking corresponding to a result from each modification instruction in an aggregate ranking of results; and
identifying, from the training dataset, a second unlabeled datapoint to present for labelling according to the second query strategy, the second unlabeled datapoint being chosen based on the aggregate ranking of results and due at least in part to a distance of the second unlabeled datapoint from a target distribution associated with the first query strategy and a closeness to a target distribution associated with the second query strategy.

20. The computer system of claim 19, wherein the instruction to modify the causal network comprises instructions for modifying a causal link between a pair of features in the causal network.

* * * * *